United States Patent
Hoshi et al.

(10) Patent No.: US 8,499,922 B2
(45) Date of Patent: Aug. 6, 2013

(54) CHIP DISCHARGE DEVICE OF MACHINE TOOL

(75) Inventors: Takashi Hoshi, Iga (JP); Ryosuke Yasumura, Koka (JP); Takenori Nishizawa, Iga (JP); Akifumi Yoshida, Iga (JP)

(73) Assignee: Mori Seiki Co., Ltd., Yamatokoriyama-Shi (JP)

( * ) Notice: Subject to any disclaimer, the term of this patent is extended or adjusted under 35 U.S.C. 154(b) by 55 days.

(21) Appl. No.: 13/225,151

(22) Filed: Sep. 2, 2011

(65) Prior Publication Data

US 2012/0079928 A1    Apr. 5, 2012

(30) Foreign Application Priority Data

Sep. 9, 2010   (JP) ................................. 2010-201967

(51) Int. Cl.
*B65G 45/14* (2006.01)
(52) U.S. Cl.
USPC .......................................... 198/498; 198/494
(58) Field of Classification Search
USPC .......................................... 198/493, 498, 494
See application file for complete search history.

(56) References Cited

U.S. PATENT DOCUMENTS

| 1,489,290 | A | * | 4/1924 | Walther | 198/498 |
|---|---|---|---|---|---|
| 2,305,484 | A | * | 12/1942 | Merchen | 198/498 |
| 3,485,342 | A | * | 12/1969 | Fechter | 198/498 |
| 3,515,260 | A | * | 6/1970 | Clyne | 198/499 |
| 3,516,535 | A | * | 6/1970 | Patz | 198/498 |
| 7,055,674 | B2 | * | 6/2006 | Magaldi | 198/494 |
| 7,416,110 | B2 | * | 8/2008 | Campbell | 198/498 |

FOREIGN PATENT DOCUMENTS

JP   2002096237 A   4/2002

\* cited by examiner

*Primary Examiner* — James R Bidwell
(74) *Attorney, Agent, or Firm* — Smith Patent Office

(57) ABSTRACT

Scraping plates include: a first scraping plate 11 attached to chains 10, with an end surface 11*c'* thereof facing a receiving plate 14 being deviated from an attachment point c' where the first scraping plate 11 is attached to the chains 10, by a distance L1 to an opposite side of an advance direction a of the chains 10; and a second scraping plate 12 attached to the chains 10, with an end surface 12*c'* thereof facing the receiving plate 14 being deviated from an attachment point d' where the second scraping plate 12 is attached to the chains 10, by a distance L2 smaller than the distance L1 of the first scraping plate 11 to the opposite side of the advance direction a.

2 Claims, 8 Drawing Sheets

CHIP DISCHARGE DEVICE OF MACHINE TOOL

BACKGROUND OF THE INVENTION

1. Field of the Invention

The present invention relates to a chip discharge device of a machine tool, and more particularly, to a reduction in an amount of a coolant which is discharged with chips to the outside of the machine and taken out of the machine.

2. Description of the Related Art

Some machine tool includes a chip discharge device automatically discharging chips produced by cutting machining or the like to the outside of the machine. The chip discharge device of this type has a problem that a coolant supplied to a workpiece machining part is discharged with the chips to the outside of the machine, which creates a demand for reducing an amount of the coolant taken out of the machine.

Conventional chip discharge devices designed to meet such a demand include one disclosed in, for example, Japanese Patent Application Laid-open No. 2002-96237. In this conventional device, a coolant tank disposed under a workpiece machining part is extended to the outside of the machine, a chip conveyor carrying dropping chips is disposed in the coolant tank, and the chip conveyor is extended to the outside of the machine.

SUMMARY OF THE INVENTION

In the conventional chip discharging device, the dropping coolant having passed through the chip conveyor can be collected by the coolant tank. On the other hand, a large amount of a coolant adheres on the chips carried by the chip conveyor, and most of this coolant is unavoidably taken out of the machine with the chips, which creates a demand for further reducing an amount of the coolant taken out of the machine.

It is an object of the present invention to provide a chip discharge device of a machine tool that has a simple structure but enables an improvement in a separation and collection ratio of a coolant adhering to chips and a reduction in an amount of the coolant taken out of the machine.

The present invention is a chip discharge device of a machine tool including: a pair of left and right circular driving-side members that are rotationally driven; a pair of left and right driven-side members disposed in correspondence to the left and right driving-side members; a pair of left and right coupling members in an endless chain shape wound around the left and right driving-side members and the left and right driven-side members respectively; a plurality of scraping plates bridged between and fixed to the left and right coupling members at predetermined pitches; and a receiving plate on which lower ends of the scraping plates passing thereabove slide in a contact state and which receives chips and guides the chips to a discharge port, wherein the scraping plates slide on the receiving plate to move the chips on the receiving plate to the discharge port, and wherein the scraping plates include: a first scraping plate attached to the coupling members, with an end surface thereof facing the receiving plate being deviated from an attachment point where the first scraping plate is attached to the coupling members, by a predetermined value or more to an opposite side of an advance direction of the coupling members; and a second scraping plate attached to the coupling members, with an end surface thereof facing the receiving plate being deviated from an attachment point where the second scraping plate is attached to the coupling members, by a smaller value than the value of the first scraping plate to the opposite side of the advance direction of the coupling members.

Here, regarding "deviated by a predetermined value or more" in the present invention, since a gap between the scraping plate and the receiving plate becomes larger as the deviation is larger as will be described later, this predetermined value is appropriately set according to a necessary size of the gap.

Further, regarding "deviated by a smaller value than the value of the first scraping plate", since the gap becomes smaller as the deviation is smaller as will be described later, the deviation of the second scraping plate is desirably decreased to the smallest possible value so that the gap becomes small.

According to the present invention, the first scraping plate is attached to the coupling members, with its end surface facing the receiving plate being deviated from the attachment point where the first scraping plate is attached to the coupling members, by the predetermined value or more to the opposite side of the advance direction. Therefore, when the first scraping plate passes near the circular driving-side members, its end surface facing the receiving plate moves while depicting a locus apart from the receiving plate. Therefore, a gap is produced between the receiving plate and the first scraping plate, and the chips moving to this gap are not pressed by the first scraping plate and thus do not move further, so that the chips remain in the gap. While the chips remain in the gap part above the receiving plate, a coolant adhering to the chips separates owing to its own weight to flow down. In this case, as an amount by which the end surface, of the first scraping plate, facing the receiving plate deviates from the attachment point where the first scraping plate is attached to the coupling members is larger, a separation amount of the first scraping plate from the receiving plate is larger, so that a larger residual amount of the chips on the receiving plate can be collected, which makes it possible for the coolant to more surely separate and flow down.

As for the second scraping plate, an amount by which its end surface facing the receiving plate deviates from the attachment point where the second scraping plate is attached to the coupling members is set smaller than that of the first scraping plate. Therefore, even when the second scraping plate passes near the driving-side members, its facing end surface moves without separating much from the receiving plate, so that the chips remaining on the receiving plate are further moved and can be dropped to the discharge port to be discharged. In this case, as the deviation amount is smaller, the separation amount can be reduced and the chips remaining in the gap can be more surely discharged.

In a preferable embodiment of the present invention, the number of the first scraping plates is larger than the number of the second scraping plates.

In the above preferable embodiment, since a larger number of the first scraping plates than the second scraping plates are provided, a residual amount and a residence time of the chips on the receiving plate increase, which accordingly ensures the separation and downflow of the coolant and makes it possible to further reduce an amount of the coolant taken out of the machine.

DETAILED DESCRIPTION OF THE PREFERRED EMBODIMENT

Figure 1:
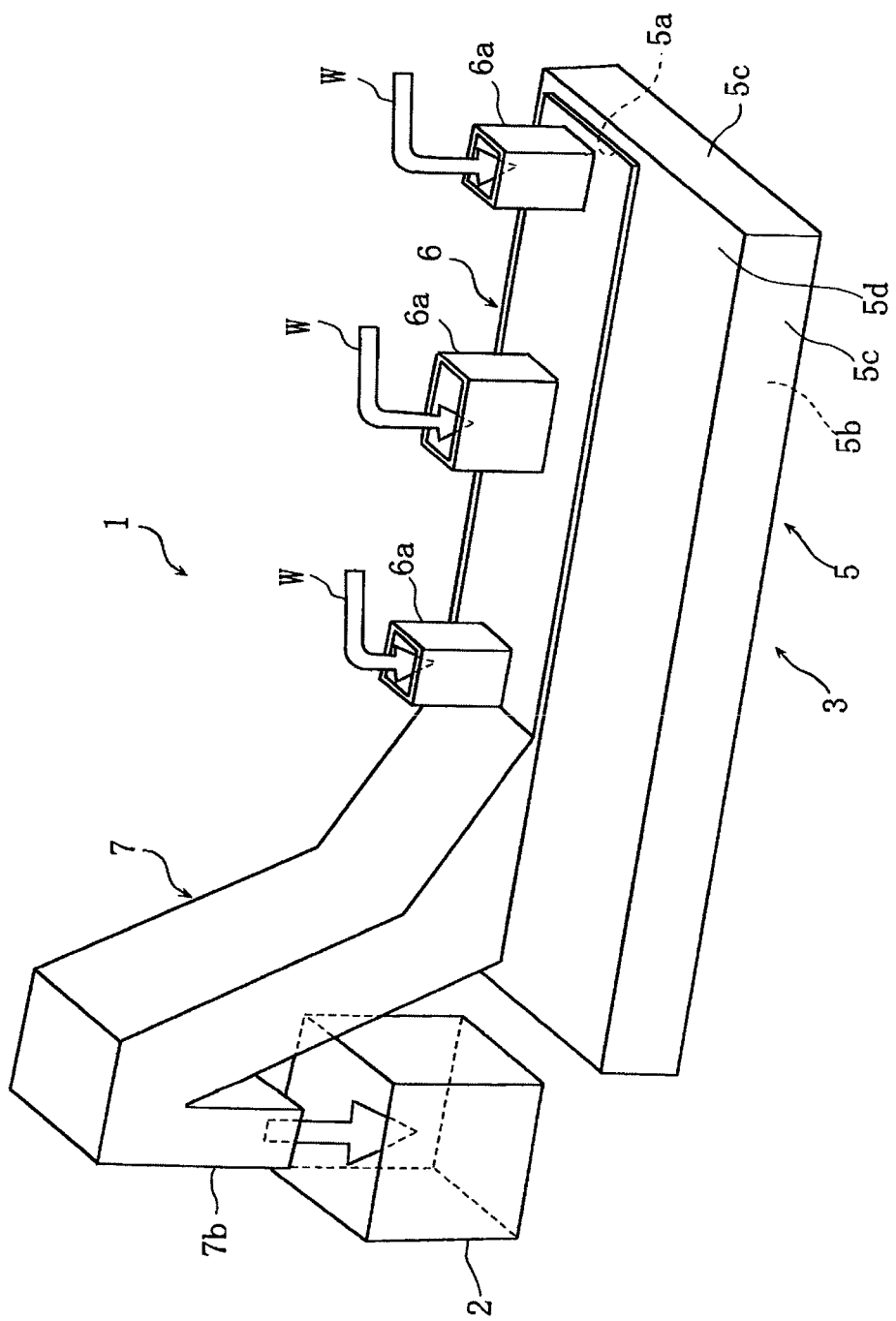
FIG. 1 is a whole perspective view of a chip discharge device of a machine tool according to an embodiment 1 of the present invention.

Hereinafter, an embodiment of the present invention will be described based on the attached drawings.

FIG. 1 to FIG. 11 are views used to explain a chip discharge device of a machine tool according to an embodiment 1 of the present invention.

In the drawings, 1 denotes the chip discharge device. The chip discharge device 1 is disposed, for example, adjacently to an NC lathe (not shown), and chips produced during machining of a workpiece are sent thereto with a coolant, and it discharges the chips to a chip collection bucket 2 disposed outside the machine while separating the coolant.

The chip discharge device 1 mainly includes a casing 3 and a chip conveyor 4 disposed in the casing 3.

The casing 3 has: a tank part 5 having a function of storing the coolant; a cover part 6 in a rectangular plate shape mounted so as to be capable of opening/closing an upper opening 5a of the tank part 5; and a discharge duct part 7 discharging the chips from a longitudinal end portion of the tank part 5 to the outside of the machine.

The tank part 5, which has a rectangular box shape, includes a bottom wall 5b, sidewalls 5c set upright on and fixed to a periphery of the bottom wall 5b, and a ceiling wall 5d fixed to the sidewalls 5c. The coolant stored in the tank part 5 is re-used after undergoing predetermined reprocessing.

The upper opening 5a is formed in the ceiling wall 5d so as to deviate to a far side in FIG. 1, and the cover part 6 is disposed on the upper opening 5a.

The cover part 6 has inlet duct parts 6a in a rectangular cylindrical shape communicating with the inside of the tank part 5, and the chips w and the coolant are sent to the inlet duct parts 6a.

The discharge duct part 7 has: an inclined portion 7a extending obliquely upward from one end portion of the tank part 5; and a discharge port 7b extending downward from an upper end portion of the inclined portion 7a.

The chip conveyor 4 has: a pair of left and right circular drive sprockets (driving-side members) 8, 8 disposed at a boundary portion between the inclined portion 7a and the discharge port 7b of the discharge duct part 7; a pair of left and right guide plates (driven-side members) 9, 9 disposed on an end portion of the tank part 5; left and right chains 10, 10 wound around the left and right drive sprockets 8, 8 and the left and right guide plates 9, 9 respectively; and a large number of first scraping plates 11 and a small number of second scraping plates 12 which are bridged between and fixed to the left and right chains 10, 10 at predetermined pitches. In this embodiment, only the single second scraping plate 12 is provided, and all the other scraping plates are the first scraping plates 11.

The left and right drive sprockets 8, 8 have teeth 8a formed around outer peripheries of their disks at predetermined pitches so as to engage with the chains 10, 10, and are fixed to left and right end portions of a drive shaft 8b respectively to be rotationally driven by a driving motor (not shown) via the drive shaft 8b. Further, the guide plates 9, 9, which are formed in a substantially semicircular shape, are fixed to the chip conveyor 4 and each have a support pipe 9a inserted therethrough, and the chains 10 slide along their outer peripheries.

The chains 10 are each formed in a ring shape including: an upper portion 10' which extends from the cover part 6 of the casing 3 along an inclined ceiling wall 7c of the inclined portion 7a and is a tension side; and a lower portion 10" which extends from an inclined bottom wall 7d of the inclined portion 7a along the bottom wall 5b of the tank part 5 and is a loose side.

Figure 2:
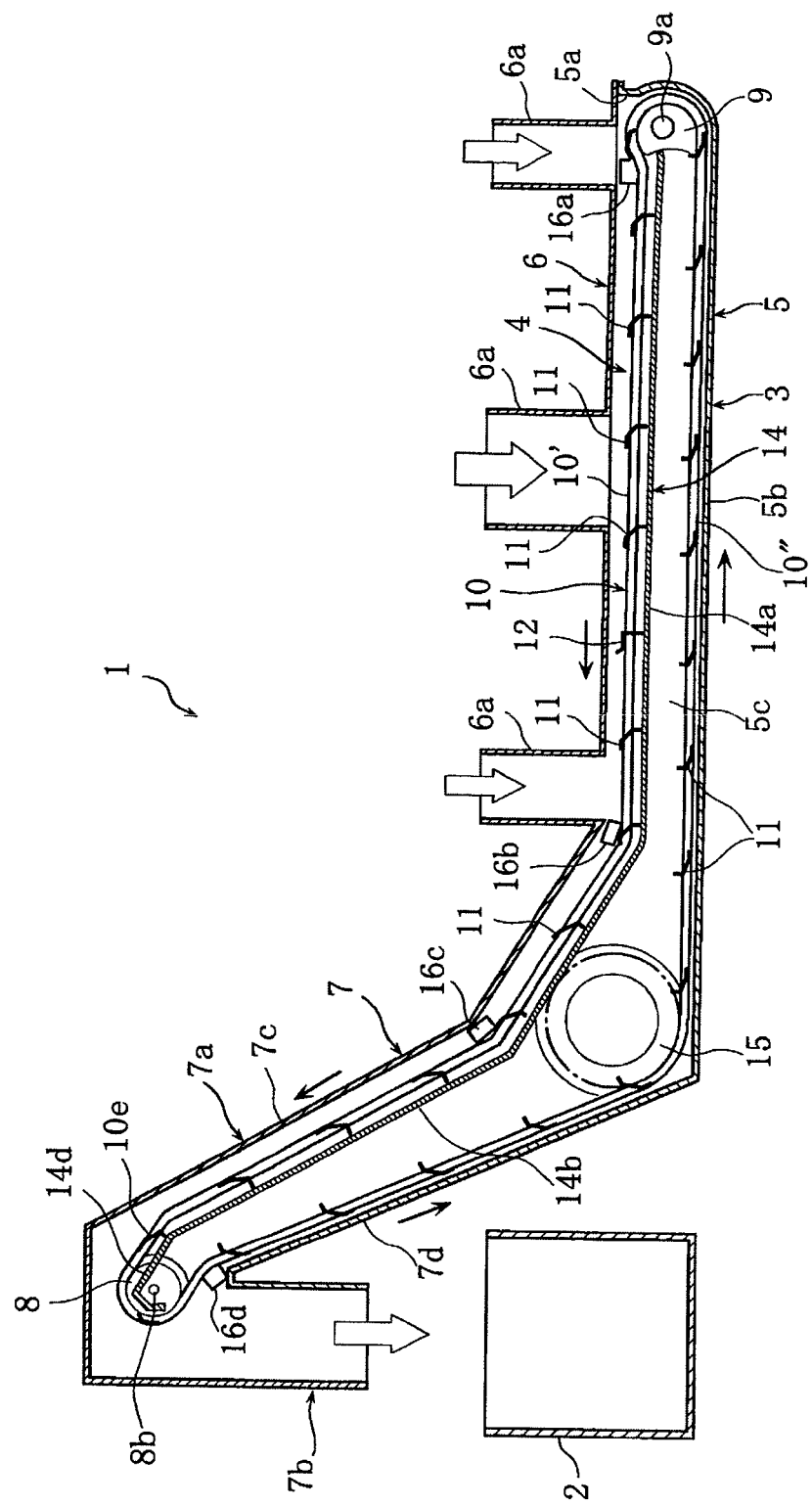
FIG. 2 is a side sectional view of the chip discharge device.

The chains 10 are each guided by guide members 16a to 16d disposed at appropriate positions and a guide sprocket 15 so as to depict a desired route shown in FIG. 2. In this embodiment, a straight portion 10e, of the upper portion 10', entering the drive sprocket 8 is guided by a guide member 14e in a belt plate shape so as to be straight (see FIG. 3, and FIG. 4).

The chains 10 each have outer plates 10a in an elliptic shape or a gourd shape and inner plates 10b, which are coupled via bushes and shafts 10c so as to form the ring shape. Attachments 10d are integrally formed with the outer plates 10a at predetermined pitches so as to be located at centers of the shafts 10c, 10c. A large number of the first scraping plates 11 and a small number of the second scraping plates 12 are bridged between the attachments 10d, 10d of the left and right chains 10, 10 and are attachably/detachably fixed by bolts 13. In this embodiment, only the single second scraping plate 12 is provided and all the other scraping plates are the first scraping plates 11. It should be noted that the second scraping plate 12 of course may be provided in plurality.

Figure 5:
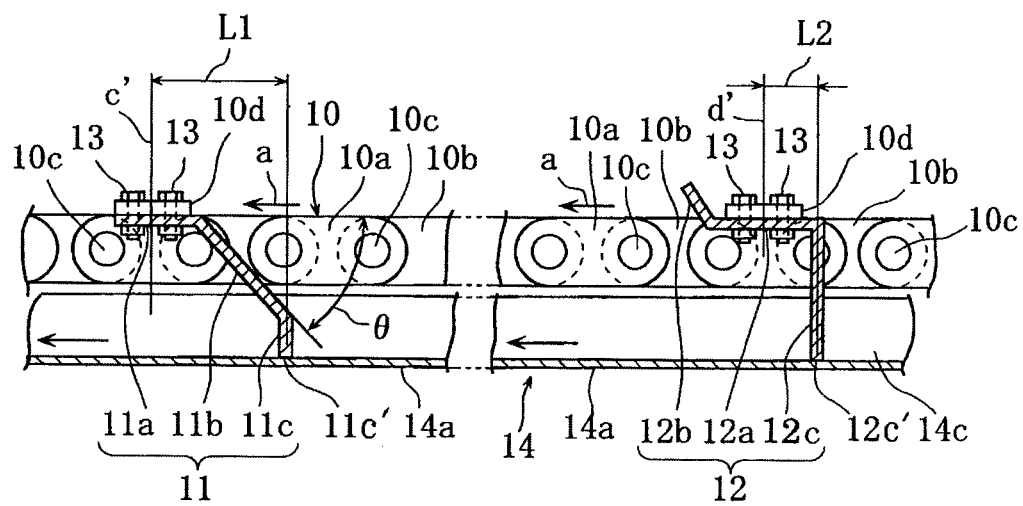
FIG. 5 is a side sectional view showing an attachment state of the first scraping plate and the second scraping plate to coupling members (chains)
Figure 6:
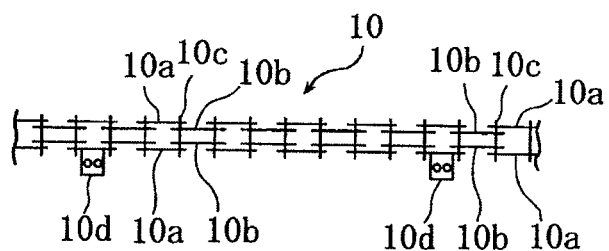
FIG. 6 is a schematic plane view of the chain.
Figure 7:
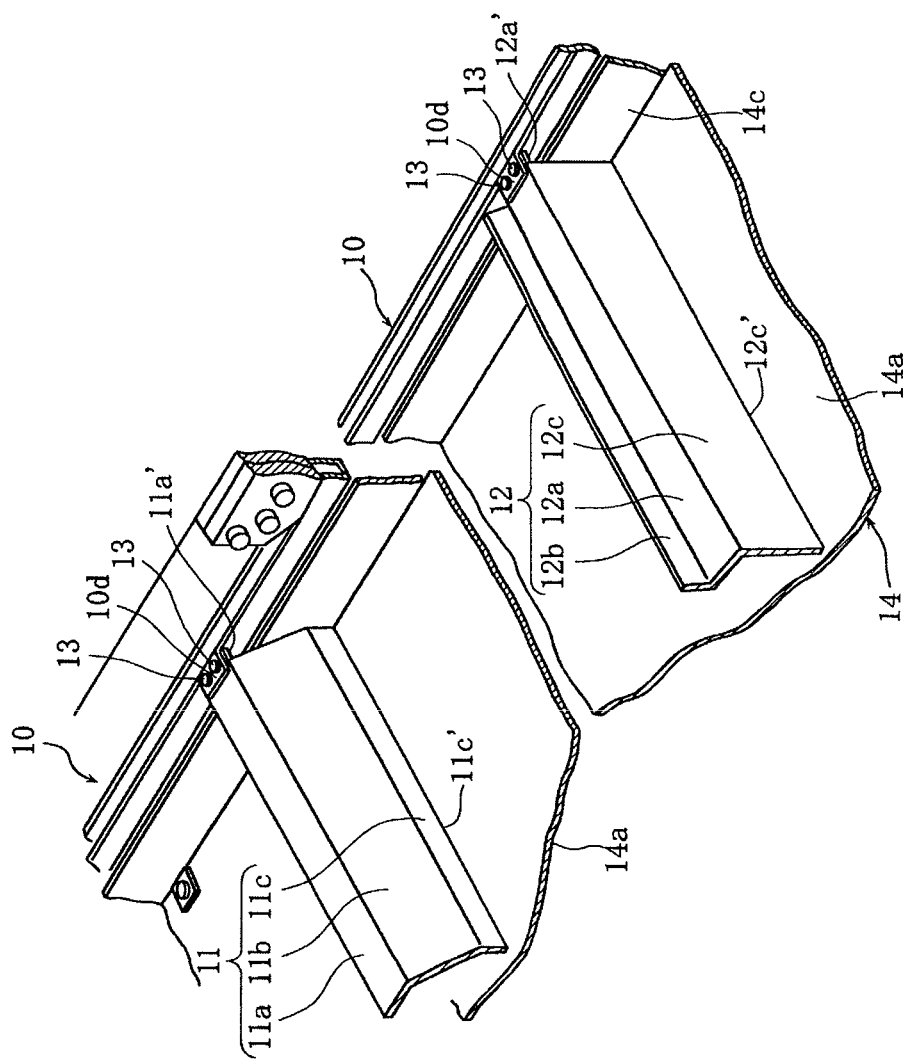
FIG. 7 is a perspective view showing an attachment state of the first scraping plate and the second scraping plate to the chain.
Figure 8:
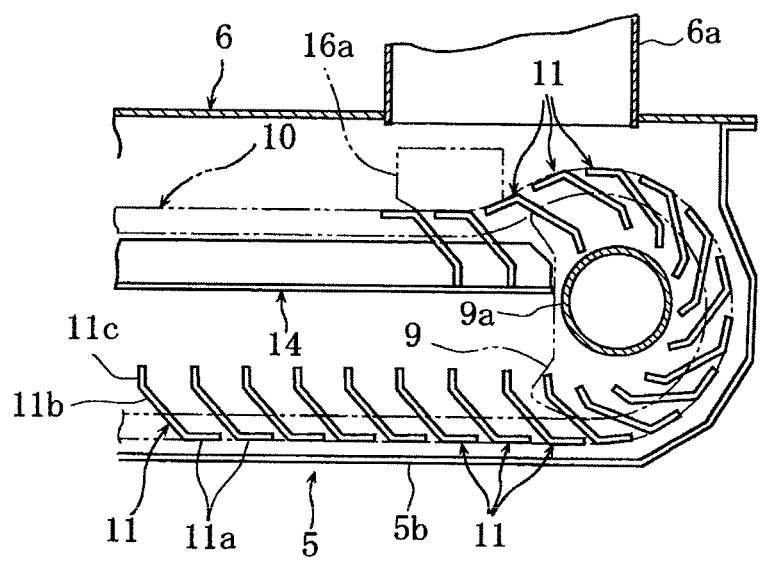
FIG. 8 is a side view showing a movement locus of the first scraping plate near a driven-side member (guide plate)
Figure 9:
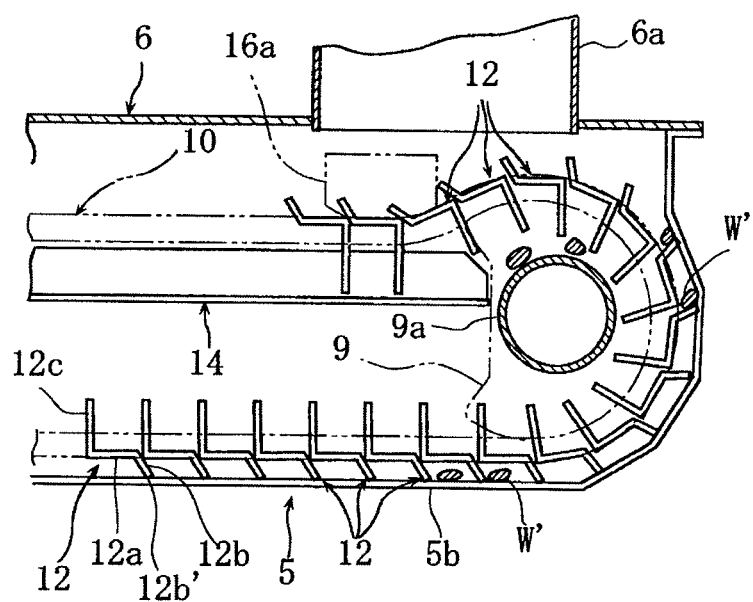
FIG. 9 is a side view showing a movement locus of the second scraping plate near the guide plate.

The first scraping plates 11 each have: an attachment side portion 11a parallel to an advance direction a of the chains 10; an inclined side portion 11b inclined from the attachment side portion 11 a obliquely downward in a rearward direction by an angle θ with respect to the advance direction a; and a scraping side portion 11c continuing from the inclined side portion 11b and bending in a direction making a right angle with the advance direction a, as is seen in its traverse section shown in FIG. 5. An end surface 11c', of the scraping side portion 11c, facing the receiving plate 14 slides on the receiving plate 14 in a contact state. Incidentally, when the chips are relatively large, a gap may be provided between the facing end surface 11c' and the receiving plate 14. Left and right end portions 11a' of the attachment side portion 11a are fixed by bolting to the attachments 10d.

In the first scraping plate 11, the facing end surface 11c' is deviated from an attachment point c' where the attachment side portion 11a is attached to the chains 10, by a distance L1 to an opposite side of the advance direction a of the chains 10.

The second scraping plate 12 has: an attachment side portion 12a parallel to the advance direction a of the chains 10; an upper scraping side portion 12b bending from a front edge of the attachment side portion 12a obliquely upward in a front direction; and a lower scraping side portion 12c bending down from a rear edge of the attachment side portion 12a in a direction making a right angle to the advance direction a, as is seen from its traverse section shown in FIG. 5. An end surface 12c', of the lower scraping side portion 12c, facing the receiving plate 14 slides on the receiving plate 14 in a contact state. Incidentally, similarly to the first scraping plates 11, when the chips are relatively large, a gap may be provided between the facing end surface 12c' and the receiving plate 14. Left and right end portions 12a' of the attachment side portion 12a are fixed by bolting to the attachments 10d.

In the second scraping plate 12, the facing end surface 12c' is deviated from an attachment point d' where the attachment side portion 12a is attached to the chains 10, by a distance L2 to the opposite side of the advance direction a of the chains 10.

Here, the deviation distance L1 in the first scraping plate 11 is set large and the deviation distance L2 in the second scraping plate 12 is set small. Concretely, the distance L2 is ½ of the distance L1 or less.

The receiving plate 14 is disposed between the upper portions 10' and the lower portions 10" of the chains 10. The receiving plate 14 is disposed so that the facing end surfaces 11c', 12c' of the first and second scraping plates 11, 12 attached to the upper portions 10' slide thereon.

Further, the receiving plate 14 has: a receiving portion 14a receiving the chips and the coolant which are carried into the inlet duct parts 6a; and a guide portion 14b guiding the chips to the discharge portion 7b along the inclined ceiling wall 7c of the inclined portion 7a. Further, on left and right edge portions of the receiving plate 14, side plates 14c preventing the chips from dropping are provided. Incidentally, downflow holes, though not shown, to let the coolant drop to the bottom wall 5b of the tank part 5 are formed at appropriate places in the receiving plate 14.

Further, the receiving plate 14 has, at its portion near the drive sprockets 8, a straight portion 14d substantially parallel to the straight portions 10e of the chains 10, and further has a bent portion 14f bending forward. The bent portion 14f and portions, of the straight portion 14d, near the bent portion serve as a storage part capable of storing the chips when the first scraping plates 11 pass this portion, and the stored chips are further moved from the bent portion 14f by the second scraping plate 12 to drop downward.

Further, gaps are provided between the attachment side portions 11a of the first scraping plates 11 attached to the lower portions 10" of the chains 10 and the bottom wall 5b of the tank part 5. An end portion 12b' of the upper scraping side 12b of the second scraping plate 12 slides on the bottom wall 5b of the tank part 5. Therefore, fine chips w' settling on the bottom wall 5b of the tank part 5 are pressed up by the second scraping plate 12 to drop down onto the receiving plate 14 again and are carried to the discharge port 7b side by the first scraping plates 11. Incidentally, it is also possible to provide a gap between the end portion 12b' and the bottom wall 5b.

In the chip discharge device 1 of this embodiment, the chips produced by the machining and the coolant are led onto the receiving plate 14 of the chip conveyor 4 from the inlet duct parts 6a. The chains 10 are driven anticlockwise in FIG. 2 by the rotation of the drive sprockets 8 of the chip conveyor 4, and the first scraping plates 11 and the second scraping plate 12 passing above the receiving plates 14 move the chips and the coolant adhering to the chips in a direction of the discharge port 7b.

Figure 3:
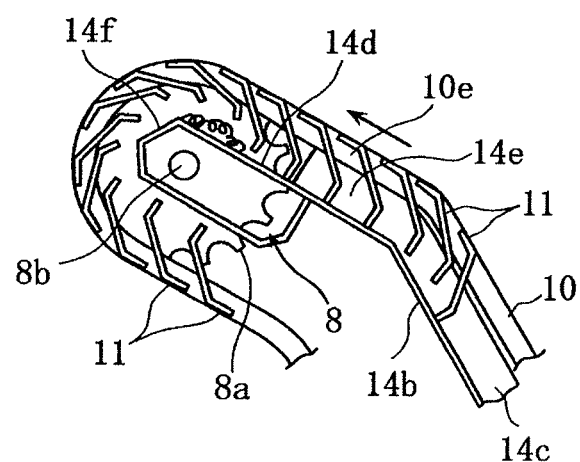
FIG. 3 is a side view showing a movement locus of a first scraping plate near a driving-side member (sprocket) in the chip discharge device.
Figure 10:
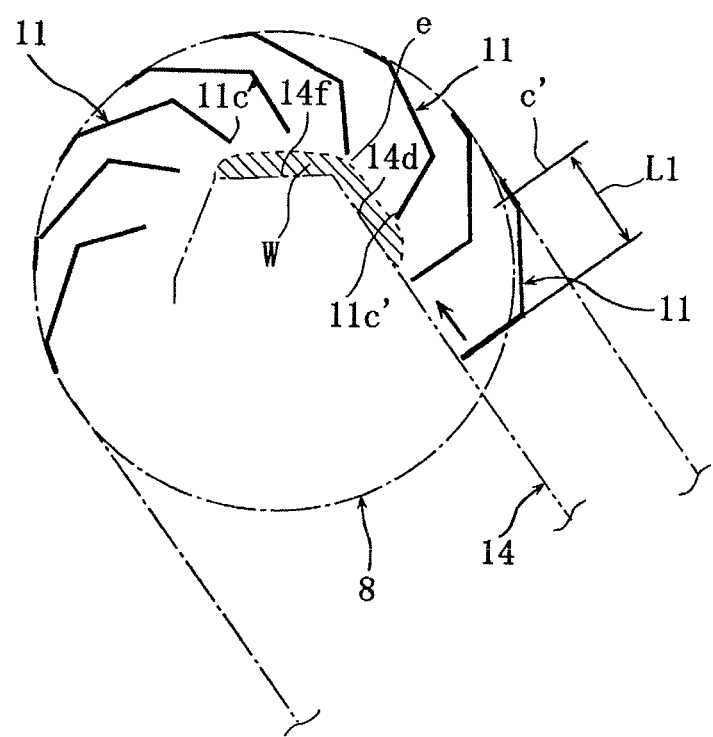
FIG. 10 is an enlarged schematic view showing the movement locus of the first scraping plate near the sprocket.

Then, when the first scraping plates 11 move to the vicinity of the drive sprockets 8, the facing end surfaces 11c' of their scraping side portions 11c gradually depict a movement locus apart from the straight portion 14d of the receiving plate 14, as shown in FIG. 3 and FIG. 10. Therefore, the chips w pressed and moved by the first scraping plates 11 remain in the gap e portion between the straight and bent portions 14d, 14f and the facing end surfaces 11c' of the first scraping plates 11. In this case, since, out of all the scraping plates, only one is the second scraping plate 12 and all the others are the first scraping plates 11, a residual amount of the chips w increases and their residence time also becomes long due to the first scraping plates 11 sequentially moving to the vicinity of the drive sprockets 8. Therefore, the coolant adhering to the chips w surely separates and flows down owing to its own weight.

Figure 4:
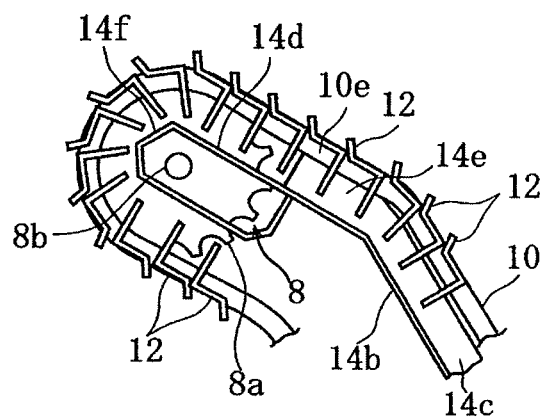
FIG. 4 is a side view showing a movement locus of a second scraping plate near the sprocket in the chip discharge device.
Figure 11:
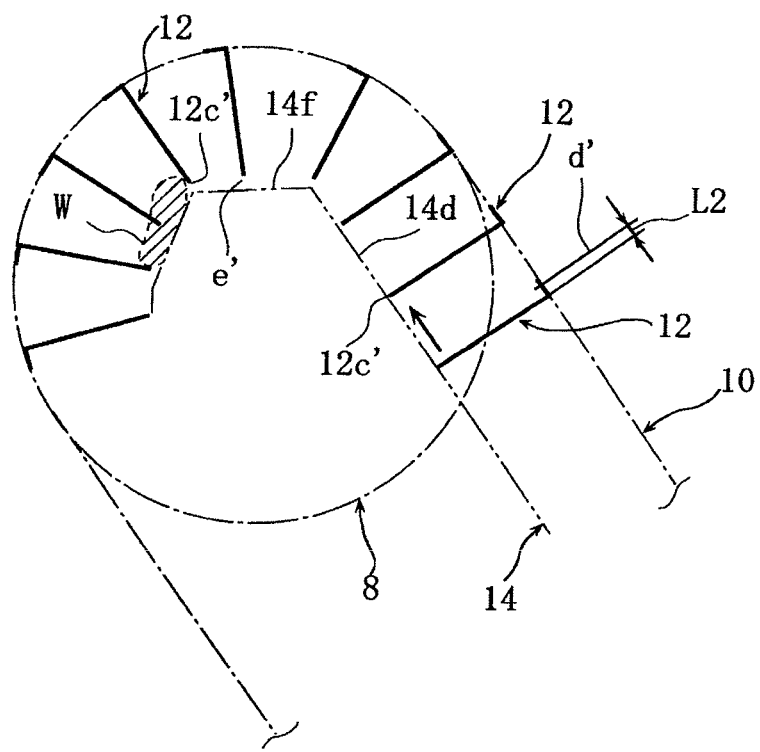
FIG. 11 is an enlarged schematic view showing the movement locus of the second scraping plate near the sprocket.

In the second scraping plate 12, as shown in FIG. 4 and FIG. 11, since the gap e' between the facing end surface 12c' of its lower scraping side 12c and the straight and bent portion 14d, 14f of the receiving plate 14 is small, the stored chips w are pushed out by the second scraping plate 12 from the straight portion 14d and the bent portion 14f to drop down to the discharge port 7b.

As described above, in this embodiment, the first scraping plates 11 are each attached to the chains 10 so that the facing end surface 11c' thereof deviates from its attachment point c' by the large distance L1 to the opposite side of the advance direction a of the chains 10. Therefore, the large gap e can be formed between the first scraping plate 11 and the straight and bent portions 14d, 14f of the receiving plate 14, which enables the chips to remain in the gap e and enables the coolant adhering to the chips to separate and flow down while the chips remain in the gap e.

Further, since the second scraping plate 12 is attached so that its facing end surface 12c' deviates from its attachment point d' by the small distance L2 to the opposite side of the advance direction a, the gap e' between the second scraping plate 12 and the straight and bent portions 14d, 14f can be made small, which makes it possible to drop the chips remaining in the vicinity of the drive sprockets 8 from the receiving plate 14 to the discharge port 7b by further moving the chips by the second scraping plate 12. In this manner, an amount of the coolant taken out of the machine with the chips can be reduced.

Further, since the upper scraping side portion 12b is formed in the second scraping plate 12 and the upper scraping side portion 12b slides on the bottom wall 5b, it is also possible to move the fine chips w' settling on the bottom wall 5b onto the receiving plate 14 to carry the chips w' to the discharge portion 7b, which enables higher discharge efficiency of the chips.

In this embodiment, a description is given of the case where the driven-side members are the guide plates which are not rotatable, but it should be noted that the driven-side members of the present invention may of course be rotatable driven sprockets. Further, the case where the coupling members are the chains is described, but the coupling members of the present invention are not limited to the chains, and may be, for example, belts, in which case drive pulleys are adopted instead of the drive sprockets.

Further, in this embodiment, a description is given of the example where the chip discharge device is disposed separately from the machine tool, but the chip discharge device of the present invention may be assembled in a bottom portion of a lathe, for instance.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:
1. A chip discharging device of a machine tool comprising:
   a pair of left and right circular driving-side members that are rotationally driven;

a pair of left and right driven-side members disposed in correspondence to the left and right driving-side members;

a pair of left and right coupling members in an endless chain shape wound around the left and right driving-side members and the left and right driven-side members respectively;

a plurality of scraping plates bridged between and fixed to the left and right coupling members at predetermined pitches; and a receiving plate on which lower ends of the scraping plates passing thereabove slide in a contact state and which receives chips and guides the chips to a discharge port, wherein the scraping plates slide on the receiving plate to move the chips on the receiving plate to the discharge port, and wherein the scraping plates include: a first scraping plate attached to the coupling members, with an end surface thereof facing the receiving plate being deviated from an attachment point where the first scraping plate is fixed to the coupling members, by a distance $L1$; and a second scraping plate attached to the coupling members, with an end surface thereof facing the receiving plate being deviated from an attachment point where the second scraping plate is fixed to the coupling members, by a distance $L2$ which is smaller than the distance $L1$ of the first scraping plate.

2. The chip discharging device of the machine tool according to claim 1, wherein the number of the first scraping plates is larger than the number of the second scraping plates.

\* \* \* \* \*